Feb. 26, 1924.   
W. L. DUBLIN   
1,484,819   
SAFETY LAMP FOR FENDERS OF MOTOR VEHICLES   
Filed Oct. 17, 1922

INVENTOR.
W. L. Dublin
BY John M. Spellman
ATTORNEYS.

Patented Feb. 26, 1924.

1,484,819

UNITED STATES PATENT OFFICE.

WINFIELD L. DUBLIN, OF TYLER, TEXAS.

SAFETY LAMP FOR FENDERS OF MOTOR VEHICLES.

Application filed October 17, 1922. Serial No. 595,093.

*To all whom it may concern:*

Be it known that I, WINFIELD L. DUBLIN, a citizen of the United States, residing at Tyler, in the county of Smith and State of Texas, have invented certain new and useful Improvements in Safety Lamps for Fenders of Motor Vehicles, of which the following is a specification.

This invention relates to headlight lamps for motor vehicles and in such connection it relates more particularly to a lamp for the fenders of the vehicle to outline the fenders thereof.

In traveling at night it is difficult to determine the degree or margin of safety or passing distance from one vehicle to another and the object of the invention is to so mount the lamp upon the fender or fenders of the automobile that the fender will be outlined by the light from the lamp and enable the driver to more accurately judge the distance of safety from another vehicle.

The improved lamp also serves as a headlight or frontlight and is simply constructed, durable and may be applied in an economical manner to motor vehicles.

The improved lamp embodying the invention will be better and more fully understood by reference to the following description, taken in connection with the accompanying drawings, forming part of the specification, in which—

Figure 1:
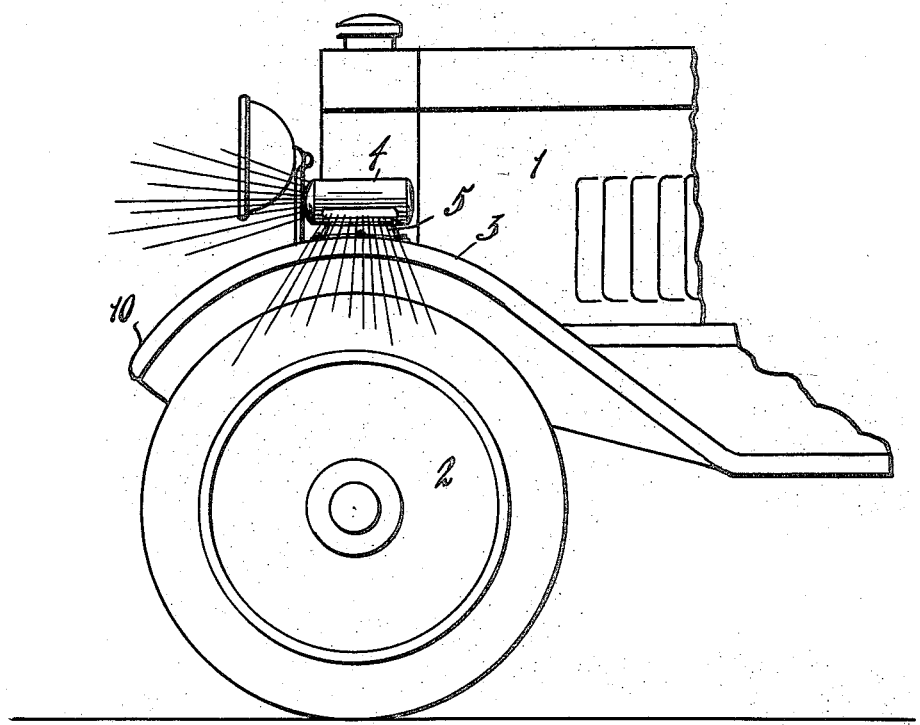
Figure 1 is a side elevational view of the front portion of an automobile and illustrating the embodiment of the invention.
Figure 3:
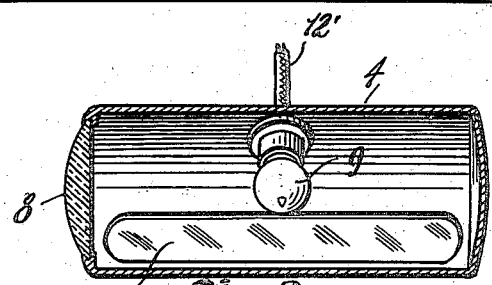
Figure 3 is a diagonal longitudinal sectional view on line 3—3 of Figure 4.
Figure 2:
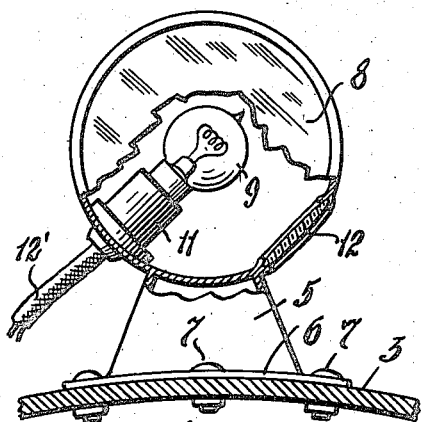
Figure 2 is a front elevational view of the lamp on a part of the fender which is partly sectioned with the lenses and body of the lamp sectioned and broken away.
Figure 4:
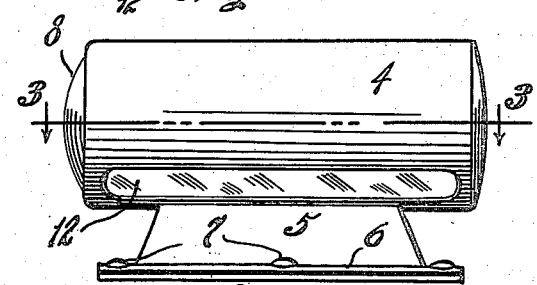
Figure 4 is a side elevational view of the lamp.

In the drawings, the numeral 1 denotes an automobile, 2 the wheels and 3 the fenders over the wheels.

In carrying out the invention, there is provided a relatively long, cylindrical shell 4 which has a support 5. The lower part of the support at 6 is bent or turned inwardly in such a manner as to lie flat and be conformably received on the curve of the fender and is secured thereto by bolts 7—7 or in any preferred manner and it should be understood that the invention is not limited in the manner of securing the lamp to the fender or in its position thereon. In one end of the body or shell 4 of the lamp is a lens 8 which throws sufficient light from an electric light globe 9 to reveal the front 10 of the fender. This globe has its socket 11 disposed diagonally on the inner side of the shell and arranged on the opposite side of the light is a lens 12 running the length of the body of the lamp. Wires 12' connects the globe 9 to a battery.

The position of the lens 12 is such that the light will be thrown onto the edge or outer side of the fender and together with the lens 8 outlines the fender so that the driver of the vehicle on which the lamp is placed on passing may clearly see the margin of safety with respect to each other. The lamp is arranged on the side of the vehicle occupied by the driver or if preferred it may be placed on both fenders.

What is claimed is—

A motor vehicle lamp, including a relatively long cylindrical body, means connected to the bottom of the body and formed for connection to the front fender of an automobile to support the body in a substantially horizontal plane, a circular lens in the front end of the body, an elongated lens having substantially parallel top and bottom sides disposed in the lower portion of the outer side of the body and arranged at an incline so as to throw the light rays onto the outer side of the fender, and a lamp extending into the body from the inner side thereof and arranged at an incline and in a plane substantially parallel to the plane of the elongated lens.

In testimony whereof I have signed my name to this specification.

WINFIELD L. DUBLIN.